No. 739,236. PATENTED SEPT. 15, 1903.
F. W. THOMPSON.
SCENIC APPARATUS.
APPLICATION FILED MAR. 4, 1903.
NO MODEL. 6 SHEETS—SHEET 1.

Fig. 1.

WITNESSES: INVENTOR
Frederick W. Thompson
BY
ATTORNEYS.

No. 739,236. PATENTED SEPT. 15, 1903.
F. W. THOMPSON.
SCENIC APPARATUS.
APPLICATION FILED MAR. 4, 1903.
NO MODEL. 6 SHEETS—SHEET 2.

WITNESSES:
INVENTOR
Frederick W. Thompson
BY
ATTORNEYS.

No. 739,236. PATENTED SEPT. 15, 1903.
F. W. THOMPSON.
SCENIC APPARATUS.
APPLICATION FILED MAR. 4, 1903.
NO MODEL. 6 SHEETS—SHEET 5.

WITNESSES

INVENTOR
Frederick W. Thompson
BY
ATTORNEYS.

No. 739,236. Patented September 15, 1903.

UNITED STATES PATENT OFFICE.

FREDERICK WILLIAMS THOMPSON, OF NEW YORK, N. Y.

SCENIC APPARATUS.

SPECIFICATION forming part of Letters Patent No. 739,236, dated September 15, 1903.

Application filed March 4, 1903. Serial No. 146,099. (No model.)

*To all whom it may concern:*

Be it known that I, FREDERICK WILLIAMS THOMPSON, a citizen of the United States, and a resident of the city of New York, borough of Brooklyn, in the county of Kings and State of New York, have invented a new and Improved Scenic Apparatus, of which the following is a full, clear, and exact description.
This invention relates to improvements in scenic apparatus, the object being to provide a device of this character so arranged as to give to persons the impression of sailing in a submarine vessel from one point to another and then back to the starting-point.

I will describe a scenic apparatus embodying my invention and then point out the novel features in the appended claims.

Reference is to be had to the accompanying drawings, forming a part of this specification, in which similar characters of reference indicate corresponding parts in all the figures.

Referring to the drawings, 20 designates the lobby or entrance platform of a building 21. Arranged in the lobby forward of the partition 22, separating it from the building, is a tank 23 for containing water. Movable up and down in the water contained in the tank and designed to be submerged therein is a boat or vessel-like structure consisting of a false work or deck 24, attached to which are turrets 25 26, these turrets being arranged near the ends of the deck. The turrets are of similar construction in all respects. Therefore a detail description of one of said turrets 25 26 will answer for both. The turrets are movable up and down in wells 27, and the said turrets are cylindrical and provided centrally with a vertical cylinder 28. The cylinder is provided with a stairway 29, which is arranged spirally around the cylinder 28, and the lower end terminates at an outlet-opening 30, formed in the turret. Rigidly secured in the cylinder 28 is a nut 31, which receives a screw-rod 32, having a bearing at its lower end in a step or socket 33, and its upper end engages in a spider 34, on which the cylinder 28 may slide.

As a means for rotating the screw-shafts for the two turrets to move them simultaneously up and down I employ a power-shaft 35, operated from a suitable motor arranged in a motor-house 36. On this shaft 35 is a bevel-gear 37, meshing with a bevel-gear 38 on one end of a shaft 39, the other end of said shaft being extended through a side opening in the turret and having connected to it a bevel-gear 40, meshing with a bevel-gear 41 on the upper end of the screw 32 for operating the turret 25. Engaging with the opposite side of the bevel-gear 37 is a bevel-gear 42 on a shaft 43, provided with a bevel-gear 44, engaging with the bevel-gear 41 on the screw-shaft 32 for operating the turret 26. It is obvious that by this arrangement the shafts 39 and 43 will be driven in opposite directions, and therefore the threads of the screw-rods 32 may be right-hand screws.

Figure 15:
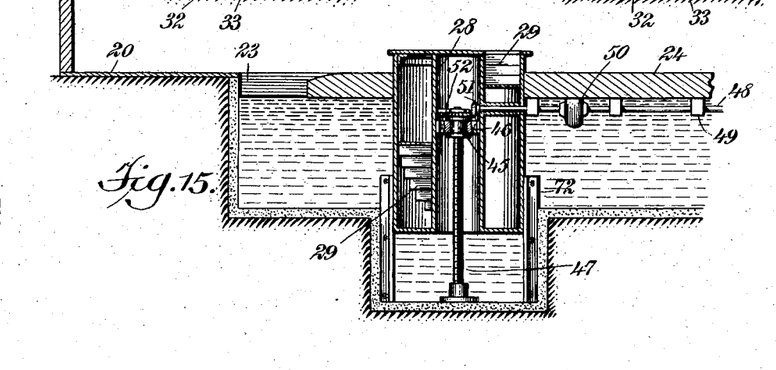
Fig. 15 shows a modified mechanism for operating the turrets.
Figure 17:
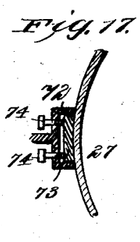
Fig. 17 is a sectional detail showing a wear-plate employed.

In Fig. 15 I have shown another mechanism for operating the two turrets. In this modification a nut 45 is mounted to turn in a spider 46, rigidly secured in the cylinder 28, this nut 45 having flanges for engaging against the upper and lower sides of the spider. In this instance the screw-shaft 47 is stationary, and rotary motion is imparted to the two nuts through the medium of a shaft 48, having bearings in hangers 49, attached to the under side of the deck 24 and driven by an electric or similar motor 50. The shaft 48 has bevel-gears 51 at its ends for engaging with bevel-gears 52 on the nuts 45.

At the head of the stairway 29 the top of the turret is provided with an opening 53, through which people may pass to the stairway, and this opening is provided with a cover 54, which obviously must be closed water-tight to prevent the entrance of water when the turret is submerged. Attached to the cover are hinged sections 55, which engage with a shaft 56, supported in brackets 57, attached to the fixed portion 58 of the turret, and extended upward and forward from this fixed portion 58 of the turret-top is a rib or bar 59, which receives a similarly-inclined hinged edge 60 of the cover.

Figure 10:
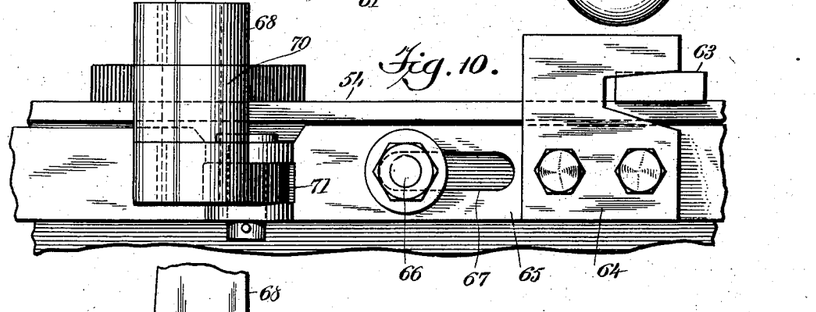
Figure 11:
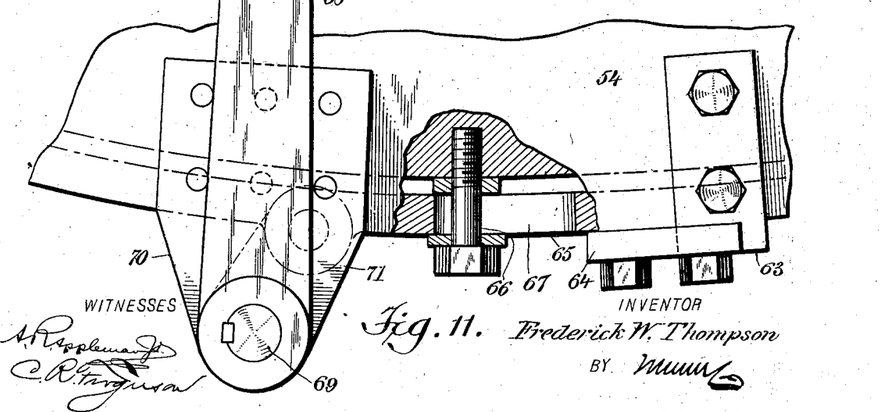

Arranged between the parts 59 and 60 is a packing 61, of leather or other suitable material, the said packing being carried by the cover, and to provide for tightening the joints or connection between the parts when the same become worn instead of mounting the hinged members 55 directly on the shaft 56 I mount them on eccentric-rings 62, which may be adjusted around the shaft, as occasion may require, to draw the parts tightly together when closed, as before mentioned. As a means for locking the cover in closed position I provide it at suitable intervals with outwardly-extended metal plates 63, designed to be engaged by hooks 64, attached to a metal strap 65, movable circumferentially of the turret. The plates are movably secured to the turret by means of bolts 66, passing through slots 67 in the metal strap 65 and engaging in the turret. As a means for shifting the metal strap for locking and unlocking the cover I employ a lever 68, connected to which is a shaft 69, having bearings in a bracket 70, attached to the top of the turret, and on the lower end of this shaft 69 is an arm 71, which has pivotal connection with said strap 65. Obviously by moving the lever 68 in one direction the hooks 65 will be moved into engagement with the plates 63, and it will be noted in Fig. 10 that the engaging surfaces of the hooks and the plates 63 are oppositely beveled or inclined, so that the cover will be drawn tightly closed. The packing material 61 must of course extend all around the cover.

The turret is guided in its up-and-down movements by means of channeled posts 72, arranged in the wells 27, and placed in the channels of the post are wear-plates 73, which are forced against the turret as wear takes place by means of bolts 74. A fixed passageway 75 provides communication between the turret and casings, which are designed to represent the cabin of a vessel and which will be more fully described hereinafter.

When the turret is in its uppermost position, water is prevented from entering the passage-way 75 by the turret closing said passage-way, while the opening 30 is in communication with the passage-way, and water is prevented from entering the turret around the doorway 30 by means of a packing 76 engaging with the turret and pressed against the same by means of screws 77, operating in tapped holes in a flange 78 on the passageway 75. A similar packing 76ª is carried by the turret and bears against the wall of the well 27.

Arranged in the building opposite the turret 25 is a turret 79, while a turret 80 is arranged opposite the turret 26, and these two turrets 79 and 80 are connected by means of a false work or deck 81. These turrets 79 and 80 and the deck 81 are stationary, and the upper portions are surrounded by water arranged in a shallow tank 82. As these turrets are not to be submerged, it is not necessary to batten down the covers 83 84 thereof. The turrets 79 80 are provided with winding stairways 85, like the stairways of the turrets first described. Between the turrets 79 and 80 and the partition 22 is a flooring 86, on which material may be placed to represent ground or stone, and the walls of the building will be provided with scenery of any desired description. I have here shown Arctic or polar scenery.

Providing communication between the passage-way 75 for the turret 25 and a passageway 87 for the turret 79 is a casing 88, which is designed to represent the cabin of a submarine vessel. The ends of this casing pass somewhat loosely into the passages 75 and 87 and are designed to have a slight longitudinal movement. For this purpose the casing is suspended from frames 89 by means of swinging hangers 90, to which motion may be imparted by any suitable means. The opposite side walls of the casing 88 are provided with boxes for containing water. The inner and outer walls of these boxes consist of panels or plates 91 92 of transparent material, such as glass, and to keep the water within the several boxes in slight agitation air is forced into the same through branches 93, leading from a pipe 94, having a flexible pipe connection 95 with a source of air under pressure. This inlet of air may be intermittent or it may be continuous.

Figure 1:
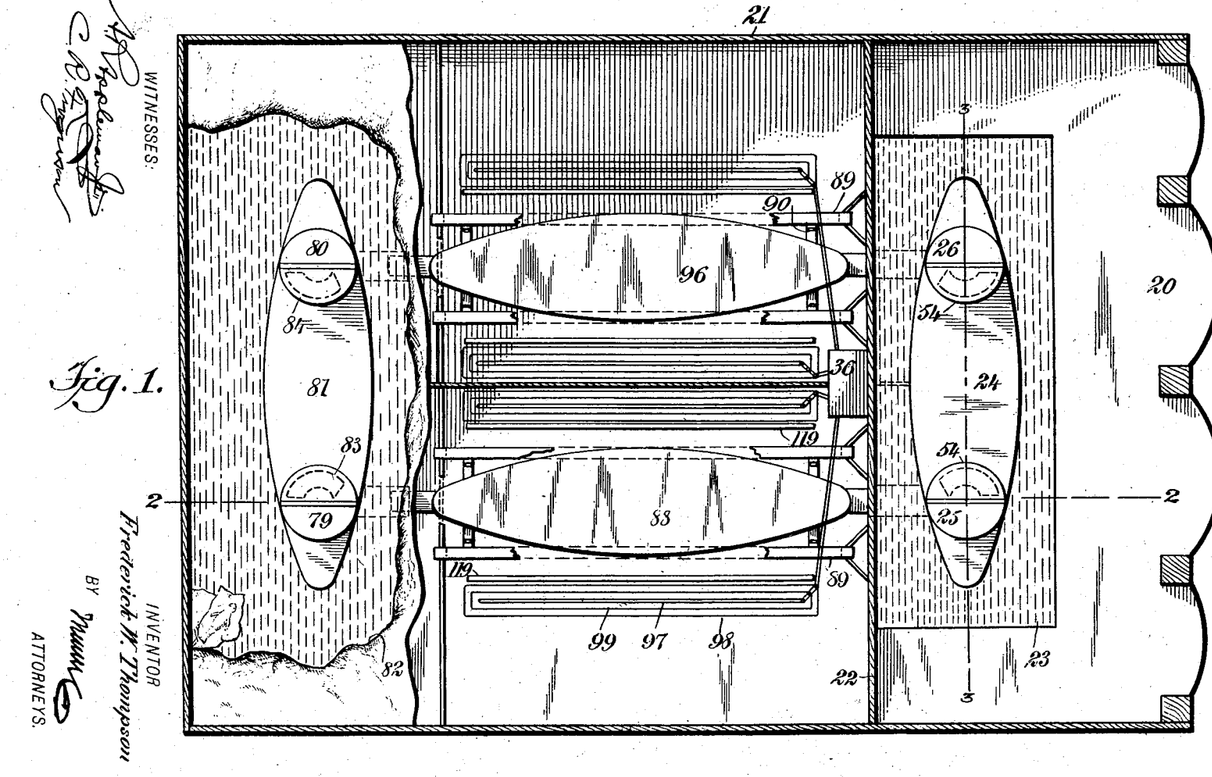
Figure 1 is a diagrammatic plan view of a scenic apparatus embodying my invention.
Figure 2:
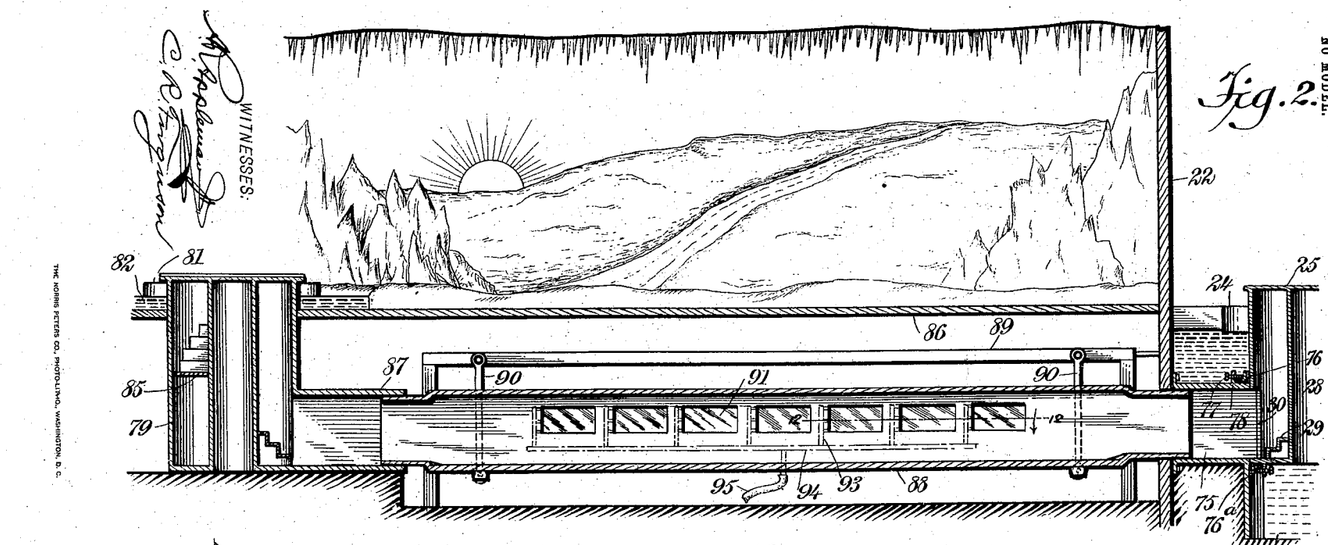
Fig. 2 is a section on the line 2 2 of Fig. 1.
Figures 3, 12:
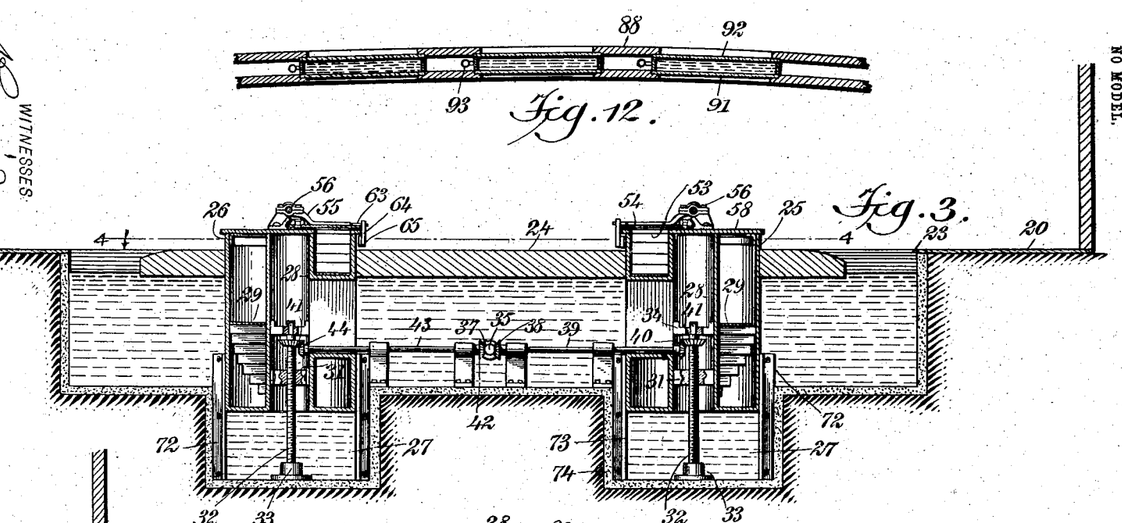
Fig. 3 is a section on the line 3 3 of Fig. 1.
Fig. 12 is a section on the line 12 12 of Fig. 2.
Figure 4:
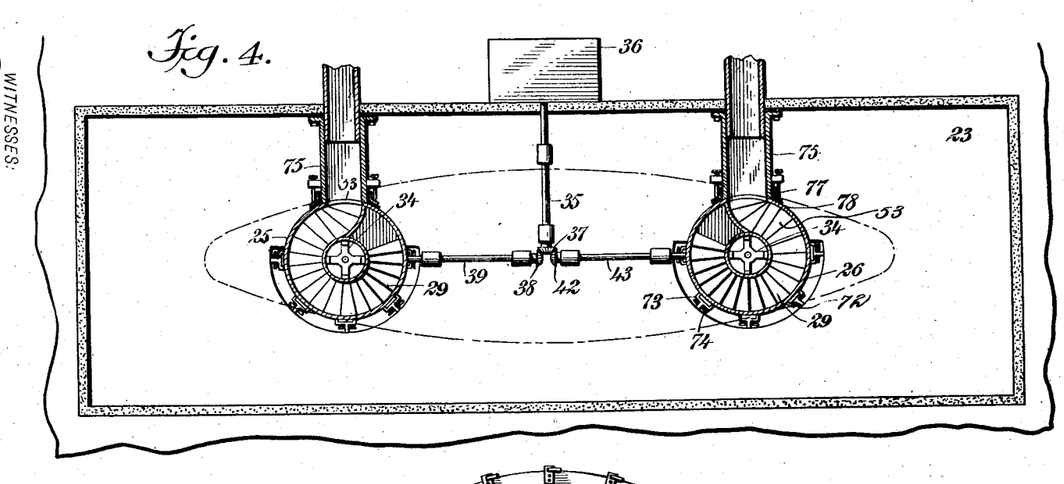
Fig. 4 is a section on the line 4 4 of Fig. 3.
Figures 5, 16:
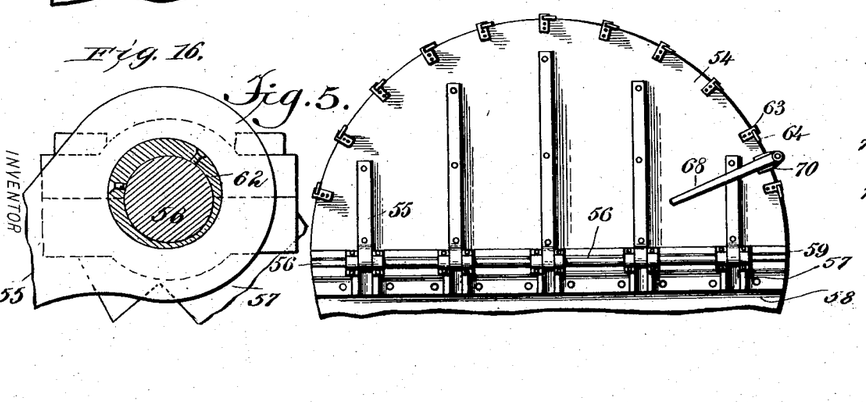
Fig. 5 is a plan view of one of the turret or hatch covers.
Fig. 16 is a sectional detail showing the hinged connection employed.
Figures 6, 7, 8:
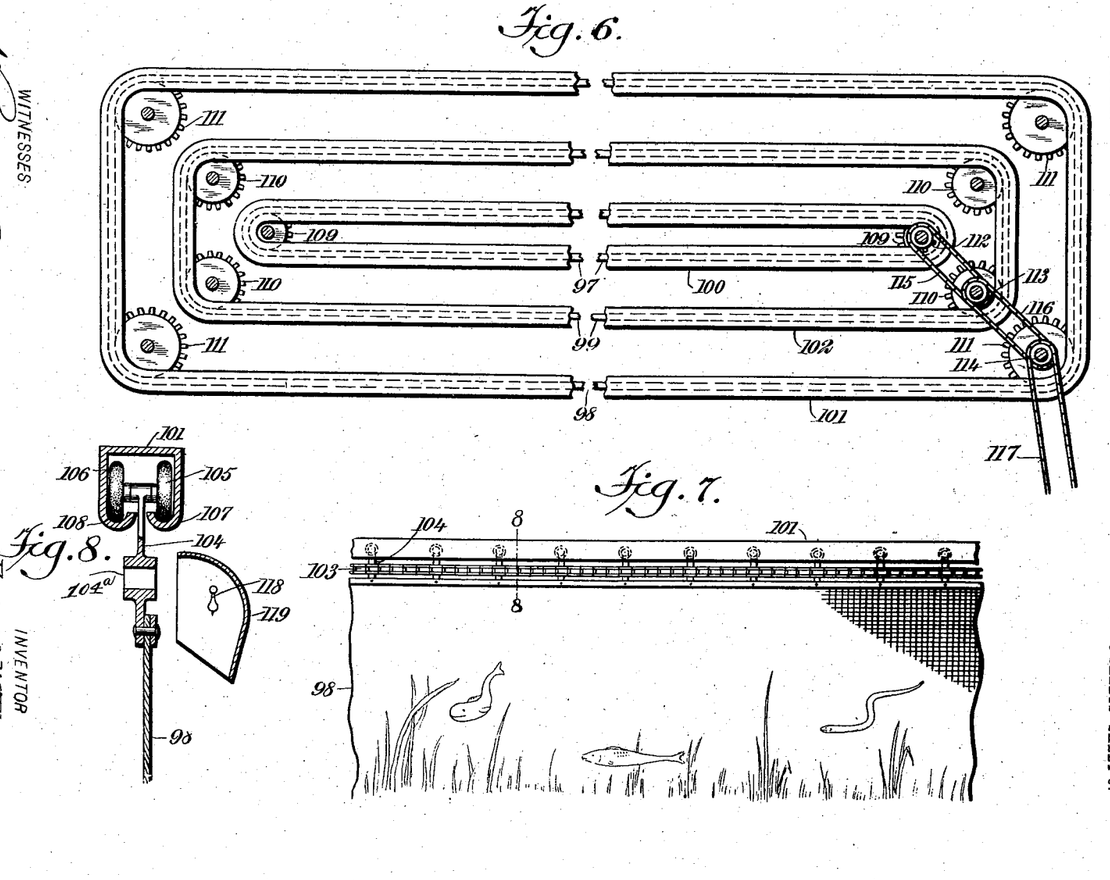
Fig. 6 is a plan view showing a system of tracks on which scenery is movable.
Fig. 7 is a side view thereof.
Fig. 8 is a section on the line 8 8 of Fig. 7.
Figure 9:
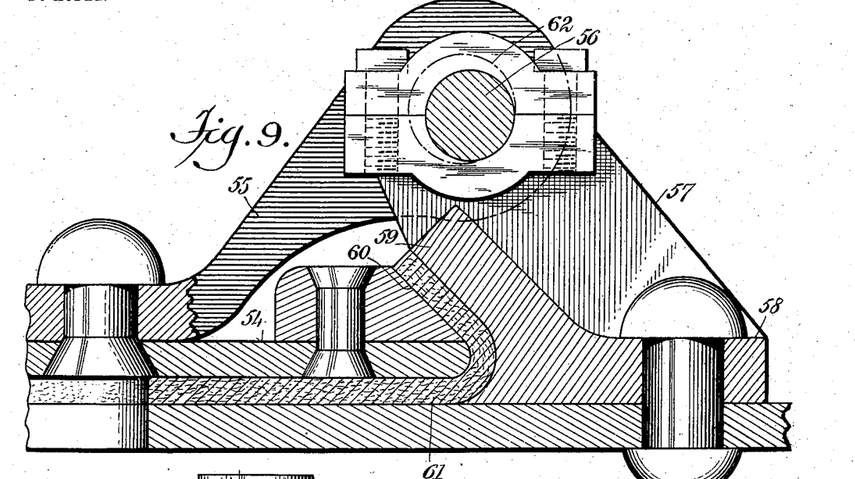
Figs. 9, 10, and 11 are details showing the swinging and locking means for the turret or hatch covers.

Communication is provided between the turrets 80 and 26 by a casing 96, similar in all respects to the casing 88 and having a similar lengthwise movement. Arranged at each side of the casing 88 are scene-screens, which may have any suitable devices painted on them. The screens of a side are arranged in sets of three designed to have a substantially rotary traveling motion. Each set of screens consists of an inner endless screen 97, an outer endless screen 98, and an intermediate endless screen 99, and it is designed that the several screens of a set shall have different speeds. The inner screen is movable around a track 100, the outer screen around a track 101, and the intermediate screen around a track 102, the screens being attached to sprocket-chains 103 by extensions of hangers 104, suspended from rollers 105 106, which move on inwardly-extended flanges 107 and 108 of the track, and each hanger has a link portion 104ª, which forms a link of the chain. The chain for the inner screen engages with two sprocket-wheels 109, the chain for the intermediate screen engages with four sprocket-wheels 110, while the chain for the outer screen engages with four sprocket-wheels 111. On the shafts of certain of the sprocket-wheels, as shown in Fig. 6, are sprocket-pinions 112 113 114. A chain 115 connects the sprocket-pinions 112 and 113, while the pinions 113 and 114 are connected by a chain 116, and from the pinion 114 a driving-chain 117 leads to the motor in the motor-house 36.

It will be noted in Fig. 6 that the sprocket-wheels for the different scene-screens are of different sizes, so that there will be a difference in the speed of travel, as before mentioned.

Arranged between the scenic screens and the cabin-like casing are illuminating devices for the screens. These illuminating devices are here shown as incandescent electric lamps 118, and arranged between the lamps and the cabin-like casing is a hood 119, which serves to reflect the light upon the scenes and at the same time cut off the light from the cabin-like casing. The screens, especially the screens 98 and 99, will be made of some transparent material—such, for instance, as gauze—so while the several screens are traveling the effect will be given of fish or other sea products moving through the water.

Figures 13, 14:
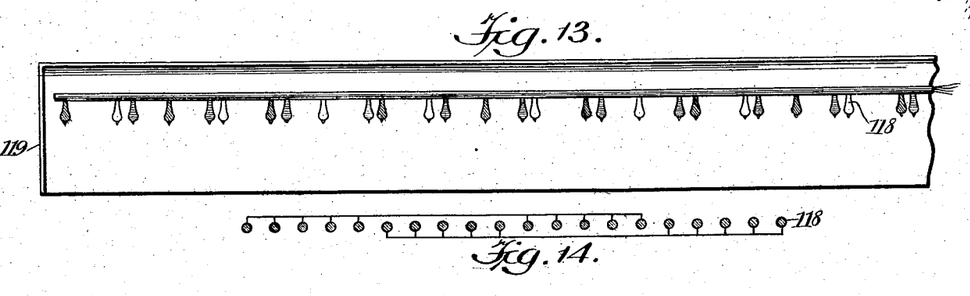
Fig. 13 is an elevation showing the arrangement of illuminating devices.
Fig. 14 is a diagrammatic view illustrating the arrangement of lights of one color.

The lights of a side have different-colored bulbs. For instance, there may be a set of white lights, a set of blue lights, and a set of green lights, and preferably to give the desired effect the blue lights will be arranged somewhat closer together than the white lights or the green lights. For instance, the blue lights may be arranged eighteen inches apart, while the white lights are arranged twenty-four inches apart, as are also the green lights, and, further, as indicated in Fig. 14, the green lights will be arranged in sets on different circuits, the sets on one circuit—say sets of five—alternating with the sets on the other circuit, and in connection with the circuits any desired controlling device may be employed for cutting the circuits alternately in and out or for simultaneously cutting in both circuits or for cutting them out.

In the operation when the turrets 25 and 26 are in elevated position and upon opening the cover of the hatch 25 the passengers will pass into the same and thence into the cabin. The turrets and deck are then to be lowered until wholly submerged, which will give to persons on the platform 20 the impression of a submarine boat. The passengers will now pass through the cabin-like casing 88 and enter the turret 79 and go out of the same onto the deck 81. From this deck the passengers may pass, by means of a suitable gang-plank, to the flooring 86 and view the Arctic or other scenery. The passengers will then pass down the hatch 80, thence through the casing 96, and out through the hatch 26 after the hatches 25 and 26, with the deck 24, shall have been raised. The several motions and the roundabout travel will give the passengers the impression of remaining on the same boat all the time, excepting, of course, when passing from the deck 81 to the floor 86; but even then the impression will be given of again boarding the vessel first entered.

Having thus described my invention, I claim as new and desire to secure by Letters Patent—

1. A scenic apparatus, comprising turrets arranged for upward and downward movement in water, fixed turrets opposite the first-named turrets, casings providing communication between the opposite turrets, transparent panels in the side walls of said casings, and scenes at the sides of the casings.

2. A scenic apparatus, comprising turrets arranged for upward and downward movement in water, fixed turrets opposite the first-named turrets, casings providing communication between opposite turrets, transparent panels in the side walls of said casings, and traveling scenes at the sides of the casings.

3. A scenic apparatus, comprising turrets arranged for upward and downward movement in water, fixed turrets opposite the first-named turrets, casings providing communication between opposite turrets, transparent panels in the side walls of said casings, and a plurality of movable or traveling scenes at each side of each casing.

4. A scenic apparatus, comprising vertically-movable turrets, fixed turrets opposite the first-named turrets, casings providing communication between opposite turrets, means for permitting a longitudinal movement of said casings, transparent panels in the side walls of the casings, and scene-screens at opposite sides of the casings.

5. A scenic apparatus, comprising a pair of vertically-movable turrets, a pair of fixed turrets opposite the movable turrets, longitudinally-movable casings providing communication between opposite movable and fixed turrets, transparent panels in the side walls of said casings, and a plurality of traveling scene-screens at opposite sides of each casing, and means for moving the screens of a set at different rates of speed.

6. A scenic apparatus, comprising vertically-movable turrets, fixed turrets opposite the movable turrets, casings providing communication between opposite movable and fixed turrets, water-boxes arranged in the side walls of the casings, the said water-boxes having transparent inner and outer walls, means for discharging air into the boxes, and scenic screens at opposite sides of the casings.

7. In a scenic apparatus, a water-tank, turrets movable up and down in said tank, a deck connecting said movable turrets, fixed turrets opposite the movable turrets, a water-tank into which the upper portions of said fixed turrets extend, a deck connecting the fixed turrets, casings providing communication between opposite fixed and movable turrets, transparent panels in the side walls of said casings, and scenic screens at opposite sides of the casings.

8. A scenic apparatus, comprising a water-tank and turrets movable up and down in said tank, the said tank having wells for receiving the lower portions of the turrets, fixed turrets opposite the first-named turrets, casings providing communication between opposite movable and fixed turrets, transparent panels in the side walls of said casings, and scenic screens at opposite sides of the casings.

9. A scenic apparatus, comprising a water-tank and turrets movable up and down in said tank, the said tank having wells for receiving the lower portions of the turrets, fixed turrets opposite the first-named turrets, casings providing communication between opposite movable and fixed turrets, transparent panels in the side walls of said casings, and endless traveling scenic screens at opposite sides of the casings.

10. A scenic apparatus, comprising a water-tank, turrets movable vertically in said tank, fixed turrets opposite the movable turrets, a water-tank into which the upper portions of the fixed turrets extend, a building in which the fixed turrets may be arranged, the walls of said building being provided with scenes, casings providing communication between opposite movable and fixed turrets, transparent panels in the side walls of said casings, and scenic screens at opposite sides of the casings.

11. A scenic apparatus, comprising a water-tank, turrets movable vertically in said tank, spiral stairways in the turrets, fixed turrets opposite the movable turrets, spiral stairways in said fixed turrets, casings providing communication between opposite movable and fixed turrets, and scene-screens arranged at opposite sides of the casings and adapted to be viewed therefrom.

12. A scenic apparatus, comprising a water-tank, turrets movable vertically in said tank, a connection between the two turrets, winding stairs in the turrets, a top for each turret consisting of a fixed portion and a swinging section forming a door over the entrance to the stairway, a rod supported on the fixed section, hinged members attached to the swinging section and engaging with said rod, a flange extended upward and forward from the edge of the fixed section, the hinged edge of the swinging section being inclined to correspond with the inclination of the flange, a packing for engaging between said flange and the inclined portion of the swinging section, and means for locking the swinging section in closed position.

13. In an apparatus of the character described, the combination with a turret and a stairway therein, of a top for the turret consisting of a fixed section and a swinging section forming a door over the entrance to the stairway, a shaft supported on the fixed section, eccentric collars adjustable around said shaft, hinged members attached to the swinging section and engaging with said eccentric collars, and means for securing the swinging section in closed position.

14. In a device of the character described, a turret, a stairway in the turret, a top for the turret consisting of a fixed section and a swinging section, a segmental strap movable circumferentially of the turret, locking devices carried by the strap, locking devices on the swinging section of the top for engaging with the first-named locking devices, and means for moving said strap.

15. In a device of the character described, a turret, a stairway in the turret, a top for the turret comprising a fixed section and a swinging section, plates extended outward from the fixed section, a segmental strap movable circumferentially of the turret, hook members on said strap for engaging with the plates, the engaging surfaces of said plates and hook members being reversibly inclined, and a lever carried by the swinging section for connection with said strap.

16. In a scenic apparatus, a water-tank, turrets movable vertically in said tank, fixed turrets, casings providing communication between the movable and fixed turrets, the said casings having transparent panels in their side walls, scenic screens arranged at opposite sides of each casing, the scenic screens of a side consisting of endless screens arranged one within the other, and means for moving the screens of a set at different rates of speed.

17. In a scenic apparatus, a water-tank, turrets movable vertically in said tank, fixed turrets, casings providing communication between the movable and fixed turrets, the said casings having transparent panels in their side walls, scenic screens arranged at opposite sides of each casing, the scenic screens of a side consisting of endless screens arranged one within the other, means for moving the screens of a set at different rates of speed, illuminating devices for the screens, and means for reflecting the light onto the screens and cutting it off from view from the casings.

18. In a device of the character described, a set of endless scenic screens of transparent gauze-like material arranged one screen within another, sprocket-chains to which the screens are attached, sprocket-wheels with which the chains engage, means for rotating the wheels, and tracks from which the screens are suspended.

19. In an apparatus of the character described, a set of endless scenic screens, certain of said screens being of gauze-like material, sprocket-chains connected to the screens, sprocket-wheels with which the chains engage, means for rotating the wheels, endless tracks arranged over the screens, each track having two tread-surfaces, hangers connected to the chains, and rollers engaging with the treads and supporting said hangers.

20. In an apparatus of the character described, a building, a water-tank arranged at one end of the building, connected turrets movable vertically in said tank, fixed turrets at the opposite end of the building, with which the movable turrets are designed to be placed in communication, each of said movable turrets having a door-opening, a winding stairway in the turret, a segmental plate designed to extend across the doorway of the turret, and packing material around the edges of said plate, and guides for the turret.

21. In a device of the character described, a building, a water-tank arranged at one end of the building, connected turrets movable vertically in said tank, winding stairways in the turrets, the said turrets having door-openings, fixed plates for closing said doorways when the turrets are in their upper positions, guide-posts for the turrets, wear-plates adjustable in said guide-posts, fixed turrets at the opposite end of the building, and casings for providing communication between opposite movable and fixed turrets.

22. In an apparatus of the character described, a water-tank, turrets movable vertically in said water-tank, guide-posts for the turrets, and means for moving the said turrets simultaneously either up or down.

23. In an apparatus of the character described, a water-tank, connected turrets movable vertically in said tank, cylinders arranged vertically in the turrets, screw connections between the cylinders of the turrets, and means for simultaneously operating the screw connections.

24. In a device of the character described, a water-tank, turrets movable vertically in said tank, fixed turrets opposite the movable turrets, casings providing communication between opposite turrets, transparent panels in the side walls of said casings, scene-screens at opposite sides of the casings, and illuminating-lamps arranged in sets of different colors.

25. In an apparatus of the character described, a water-tank, turrets movable vertically in said tank, fixed turrets opposite the movable turrets, casings providing communication between opposite movable and fixed turrets, transparent panels in the side walls of the said casings, scenic screens at opposite sides of the casings, and incandescent lamps arranged between the screens and casings, the said lamps being placed in sets of different colors, the lamps of one color being arranged in sets on independent electric circuits, the sets of one circuit alternating with the sets of the other circuit.

In testimony whereof I have signed my name to this specification in the presence of two subscribing witnesses.

FREDERICK WILLIAMS THOMPSON.

Witnesses:
   ELMER S. DUNDY,
   FRED McCLELLAN.